US012663558B2

(12) United States Patent
Erinjippurath et al.

(10) Patent No.: US 12,663,558 B2
(45) Date of Patent: Jun. 23, 2026

(54) CLIMATE SCENARIO ANALYSIS AND RISK EXPOSURE ASSESSMENTS AT HIGH RESOLUTION

(71) Applicants:Gopal Erinjippurath, San Francisco, CA (US); Tristan Ballard, San Francisco, CA (US)

(72) Inventors: Gopal Erinjippurath, San Francisco, CA (US); Tristan Ballard, San Francisco, CA (US)

( * ) Notice: Subject to any disclaimer, the term of this patent is extended or adjusted under 35 U.S.C. 154(b) by 565 days.

(21) Appl. No.: 17/529,670

(22) Filed: Nov. 18, 2021

(65) Prior Publication Data

US 2023/0152487 A1 May 18, 2023

(51) Int. Cl.
| | |
|---|---|
| *G01W 1/10* | (2006.01) |
| *G06N 20/00* | (2019.01) |
| *G06Q 10/0635* | (2023.01) |
| *G06Q 50/26* | (2024.01) |

(52) U.S. Cl.
CPC .............. *G01W 1/10* (2013.01); *G06N 20/00* (2019.01); *G06Q 10/0635* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 2016/0179994 A1* | 6/2016 | Levine | G06F 30/20 703/2 |
| 2016/0196513 A1* | 7/2016 | Mallon | G06F 11/3409 705/7.28 |
| 2019/0026759 A1* | 1/2019 | Ratnaswamy | G06F 16/288 |
| 2020/0082041 A1* | 3/2020 | Albert | G06N 3/084 |
| 2020/0193341 A1* | 6/2020 | Barak | G06Q 10/06375 |
| 2021/0064802 A1* | 3/2021 | Albert | G06N 3/047 |
| 2021/0182357 A1* | 6/2021 | Partee | G06F 17/13 |
| 2021/0271934 A1* | 9/2021 | White | G06N 3/045 |
| 2021/0287521 A1* | 9/2021 | Stone | G05B 13/0265 |
| 2022/0415155 A1* | 12/2022 | Eby | G08B 29/26 |

OTHER PUBLICATIONS

Ganguly, Auroop R., and Karsten Steinhaeuser. "Data mining for climate change and impacts." 2008 IEEE international conference on data mining workshops. IEEE, 2008. (Year: 2008).*

(Continued)

*Primary Examiner* — Raymond L Nimox

(57) ABSTRACT

A plurality of climate models for a variety of hazards and/or initial conditions to produce a collection of Hazard Exposure (Risk) Maps. The Hazard Exposure Maps are transformed to high resolution (and may be filtered) and convolved with auxiliary data related to one or more hazards. The now super resolution maps are input to a learning engine along with spatiotemporally harmonized historic events and active near real-time events to produce a calibrated model (Asset Level Exposure Risk Estimation Model) that utilizes the super resolution maps and asset location(s) to project risk for each asset. The projected risk may be provided to asset operators/ owners, initiate signal alerts and other messages, invoke automated responses to protect/preserve assets. The risk results may also be grouped in risk valuation datasets.

16 Claims, 9 Drawing Sheets

(56) References Cited

OTHER PUBLICATIONS

Koudogbo, Fifamè N., et al. "EO data for rapid risk analysis with the RASOR platform." 2015 IEEE International Geoscience and Remote Sensing Symposium (IGARSS). IEEE, 2015. (Year: 2015).*

Mysiak, Jaroslav, et al. "Climate risk index for Italy." Philosophical Transactions of the Royal Society A: Mathematical, Physical and Engineering Sciences 376.2121 (2018): Mar. 5, 2017. (Year: 2018).*

Leinonen, Jussi, Daniele Nerini, and Alexis Berne. "Stochastic super-resolution for downscaling time-evolving atmospheric fields with a generative adversarial network." IEEE Transactions on Geoscience and Remote Sensing 59.9 (2020): 7211-7223. (Year: 2020).*

* cited by examiner

CLIMATE SCENARIO ANALYSIS AND RISK EXPOSURE ASSESSMENTS AT HIGH RESOLUTION

COPYRIGHT NOTICE

BACKGROUND

Field

Climate analysis and climate analysis based asset protection.

Description of Related Art

Hurricane and other climate phenomena are known and techniques to preserve assets including hurricane shutters and construction techniques, fireproofing are known.

SUMMARY

The present inventors have realized the need to better protect assets from climate and climate related events such as fires and hurricanes and particularly those assets affected by changing climate. Better protection may be afforded, for one example, by allocating a higher percentage of protection resources in more at risk and/or more valuable/critical assets, particularly those at an even greater risk due to climate change. Such allocations may be guided through the preparation of a super resolution climate analysis. Such analysis shows the current risk and may include risk from increasing or changing conditions globally and with extreme locality at and around one or more assets. Changing conditions may include, for example, global warming, deforestation, general trends, local issues and/or any of the downstream effects resulting from such changes.

In one embodiment, a method of asset protection is provided comprising applying an asset location to at least one high resolution exposure map to determine an amount of risk to the asset. The high resolution exposure map may comprise a super resolution version of a lower resolution hazard exposure map, and the lower resolution hazard exposure map may be based on an existing climate model. The lower resolution hazard exposure map may be super resolved by translation to high resolution and applying auxiliary spatiotemporal climate data.

In another embodiment, a super resolution module is provided, comprising, an input for spatial pre-processed land cover type, an input for temporal pre-processed auxiliary variable, an input for a low resolution hazard exposure map, and a translating (e.g. upscaling) module comprising a filtered or filterless operation for translating the low resolution hazard map, a convolution module configured to merge the translated low resolution hazard map and the land cover and auxiliary variables data to produce a high resolution exposure map, and an output configured to output the high resolution exposure map for use in climate projection planning and asset preservation.

In yet another embodiment, a climate model service may be provided, comprising, a web page displaying one or more parameters for activating a climate model, and an API connected to the web page such that the API receives one or more parameters for the climate model and invokes the climate model using the parameters, and the web page may be configured to display results of the climate model invocation.

And in yet another embodiment, a learning system is provided comprising a learning paradigm based on a super resolution of a hazard model at a first resolution and at least one auxiliary dataset of a second resolution higher than the first resolution. Although lower resolution auxiliary datasets may be utilized. The learning system may be trained via comparison of the super resolution hazard model to spatiotemporal harmonized historic events and real-time conditions against a spatial test model. The trained learning system may be applied to evaluate a high resolution hazard exposure map with respect to at least one asset location. The learning system may be trained via comparison of a super-resolution hazard model to spatiotemporal harmonized historic events and real-time conditions against a spatial test model which targets an asset location for which a subsequent risk exposure product (such as a risk exposure map, alerts issued, planning and risk preparation instructions or suggestions, automatic shut-down or equipment preparation, etc., for example) is produced.

The present application describes many embodiments including the above and others described elsewhere herein and no single feature or component of one embodiment is exclusive thereto or required in any other embodiment even if described or implied as important to a particular embodiment. Further, as will be appreciated by the ordinarily skilled artisan, the various components of the different embodiments may be swapped, interchanged, or added to any other embodiment within the purview of the same artisan in light of the present disclosure.

Portions of the embodiments, whether a device, method, or other form, may be conveniently implemented in programming on a general purpose computer, or networked computers, and the results may be displayed on an output device connected to any of the general purpose, networked computers, or transmitted to a remote device for output or display. In addition, any components of any embodiment represented in one or more computer program or module(s), data sequence(s), and/or control signal(s) may be embodied as an electronic signal broadcast (or transmitted) at any frequency in any medium including, but not limited to, wireless broadcasts, and transmissions over copper wire(s), fiber optic cable(s), and co-ax cable(s), etc.

DESCRIPTION OF THE DRAWINGS

A more complete appreciation of the various embodiments and many of the attendant advantages thereof will be readily obtained as the same becomes better understood by reference to the following detailed description when considered in connection with the accompanying drawings, wherein.

DESCRIPTION

Figure 1:
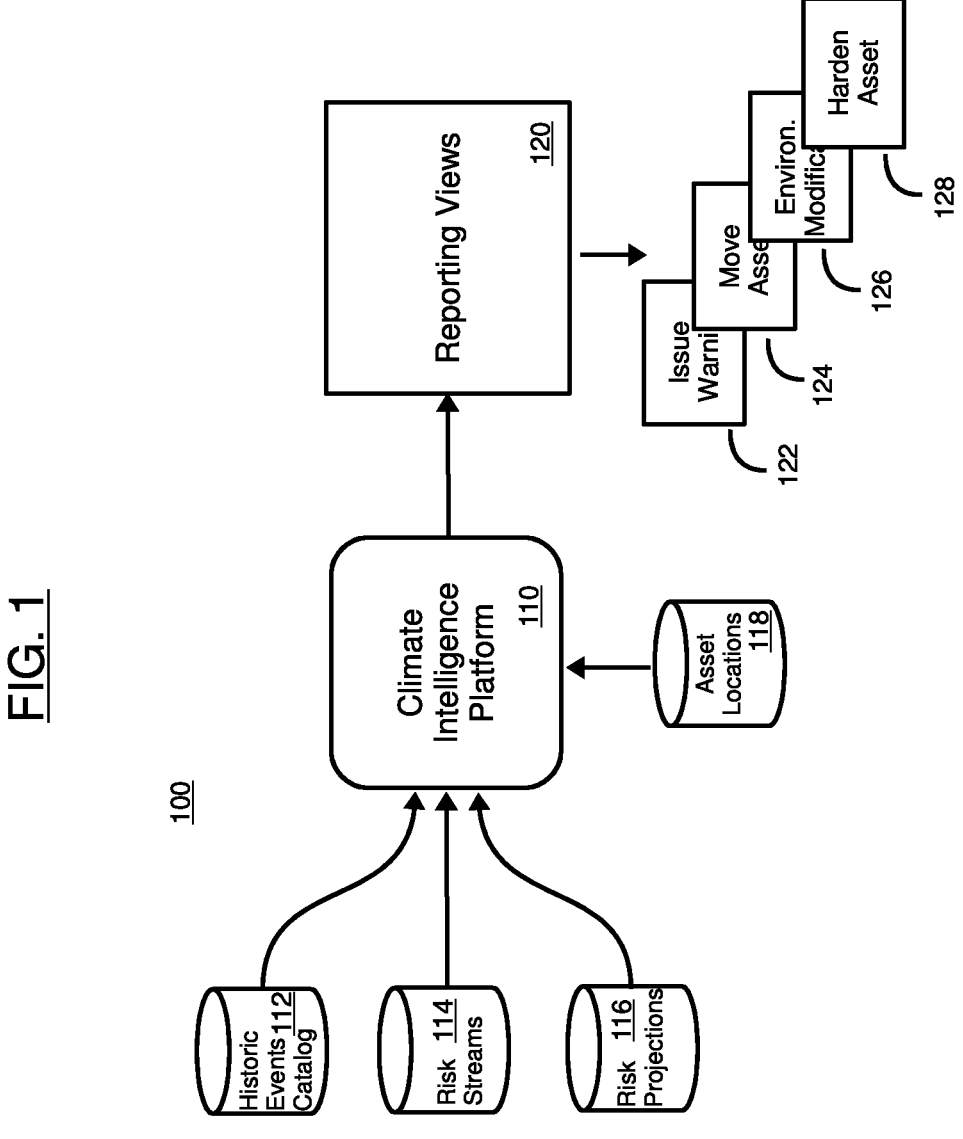
FIG. 1 is a block diagram illustrating an intelligent climate analysis and reporting system according to an embodiment.

Referring now to the drawings, wherein like reference numerals designate identical or corresponding parts, and more particularly to FIG. 1 thereof, there is illustrated a block diagram of a system 100 including a climate intelligence platform 110 and an action module 120 (reporting views) according to an embodiment. The climate intelligence platform enables actionable insights from spatially oriented climate data around acute physical hazards like fires, floods, tropical cyclones and sea level risk. Using a combination of historic hazard exposure event catalogs (e.g., Historic Events Catalog 112), near real time (and/or real-time) hazard event streams (e.g., Risk Streams 114) and forward looking climate hazard projections (e.g., Risk Projections 116), the intelligence platform applies the data to super-resolve spatial data creating a super resolution map at any location which may include, for example, one or more Assets (e.g. asset locations 118).

Based on the super resolved map, the system uses asset locations from a data collection to produce risk assessment datasets and reporting views for users to understand the climate related risk to their tangible assets. Such tangible asset may be, for example, an oil platform, a plant, a utility facility, homes, dams, train or railway, bridges, municipal equipment, insured buildings, or any other asset or type of infrastructure which may be critically important to a corporation, municipality, community, or nation.

The reporting views 120 may provide reports for review by analysts, or may be connected to other systems to take automatic precautionary measures or implement safety, asset protection, automated warnings, alerts to management or works via a cellular network, for example. Such alerts may show up on authorized personnel mobile devices or may, in whole or in part, be publically released. Such automated measures may include, closing gates, shutting windows, shutters, or doors, turning on sprinklers, notifying personnel on-call to designated or other locations. Such automated measures may include moving assets to more secure locations, shutting down electrical grids, networks, or backing up data (e.g., to remote locations) and then optionally shutting down networks and/or power grids. Precautionary measures and/or actions taken automatically or via personnel/contractors under direction or by alert may include, for example, 122-128 as shown in FIG. 1 and/or others including any such actions described herein.

Some alerts may set into action other procedures that include both manual and automated measures. With enough lead time, environmental factors may be adjusted or action taken to avert what may soon become an imminent threat.

The intelligence platform may analyze immediate conditions or risks and/or may analyze longer term patters such that sufficient lead time is available for more extensive planning and countermeasures. This is the case for example, when analyzing longer term trends and associated changing weather patterns. In such cases the reports may direct via email or display on a computer screen, potential threats or possible remedial measures that may be taken to protect various assets from future threats (e.g., 6 months to 10 year time frames, for example).

As just one example, one set of data may show a pattern of a major wildfire once every 20 years in any given 25 square kilometer section of a 100,000 square kilometer forest (e.g., Historic Events Catalog 112). A near real-time risk stream may provide that there have already been two major wildfires this year alone, conditions are record-dry, and risk projections are showing increased wildfire occurrences and more dry weather. Accordingly, automated tasks such as increased sprinkling on asset properties may initiated, computers backed up at increased intervals, and urgent reports may be sent to management suggesting long-term moves of critical infrastructure to more secure locations.

Figure 2:
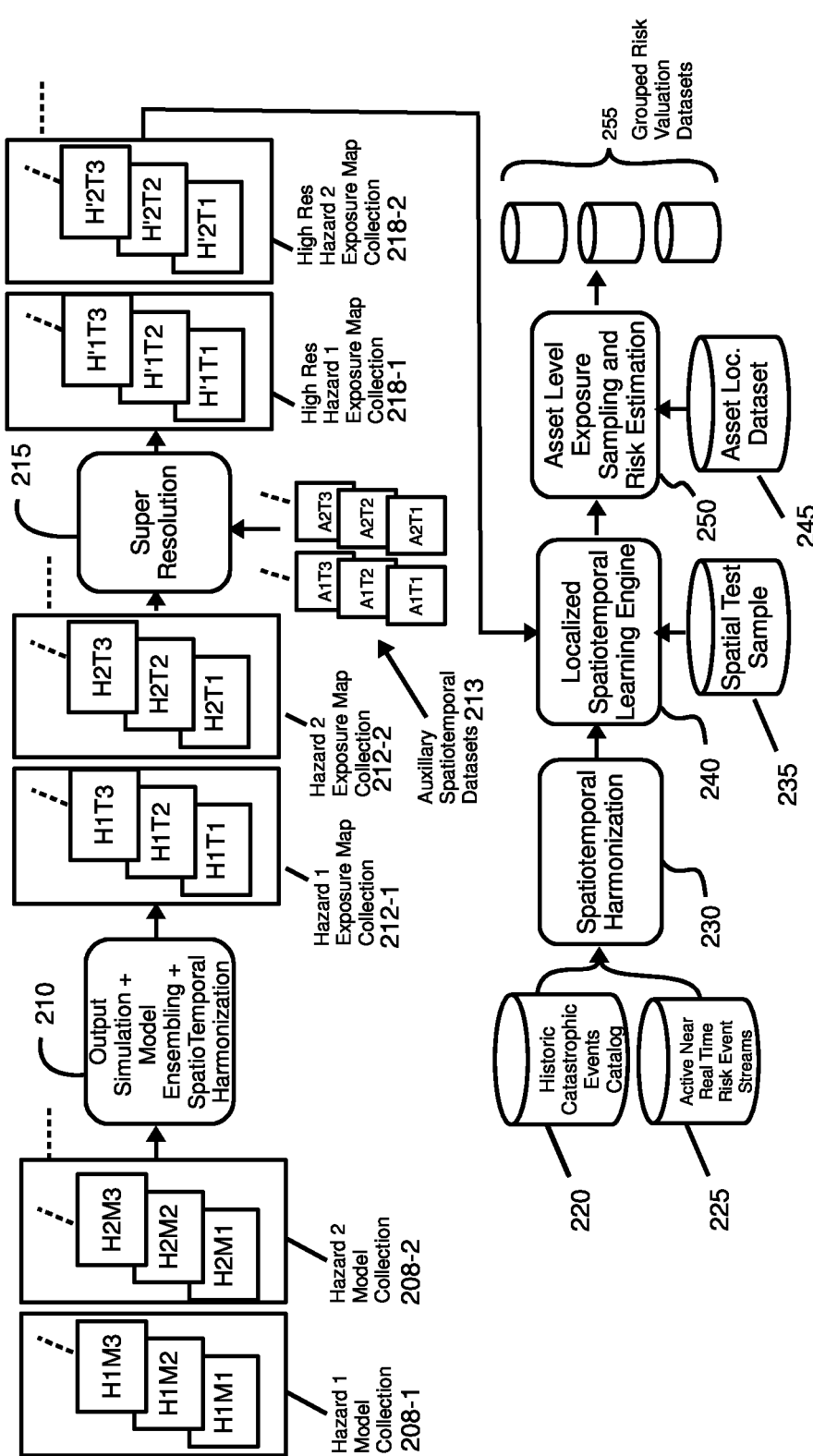
FIG. 2 is an architectural drawing of a climate analysis, super resolution, and asset/asset risk analysis process according to an embodiment.

FIG. 2 is an architecture of a climate analysis, super resolution, and asset/asset risk analysis process according to an embodiment. FIG. 2 provides a detailed workflow of an example climate intelligence platform. For each hazard type (Hi), a combination of hazard models (HiM1, HiM2, HiM3, . . . ) may be implemented to form a (Hi) hazard model collection. A collection of simulations may be run from each of these models based on different climate scenarios and/or different initial conditions to produce climate projections at specific spatial and temporal resolution (Output Simulation 210). In one embodiment, results of the climate projections may be ensembled based on the hazard type and produce harmonized hazard exposure map collections for each hazard over time (Hij—i is index of the hazard type and t is the time index). Further, differences in space and time may be harmonized.

For effective risk assessments, high resolution risk maps are desired. Using auxiliary variables like temperature, dryness, wetness, rainfall, land surface type and altitude (Auxiliary Spatiotemporal Datasets 213), the resolution of the hazard exposure maps are increased with high accuracy mirroring resolution of the Auxiliary ST Datasets 213—the technique is called super resolution. The results of the super resolution are high resolution hazard exposure map collections (H'ij—is index of the hazard type and j is the time (t) index).

Figure 7:
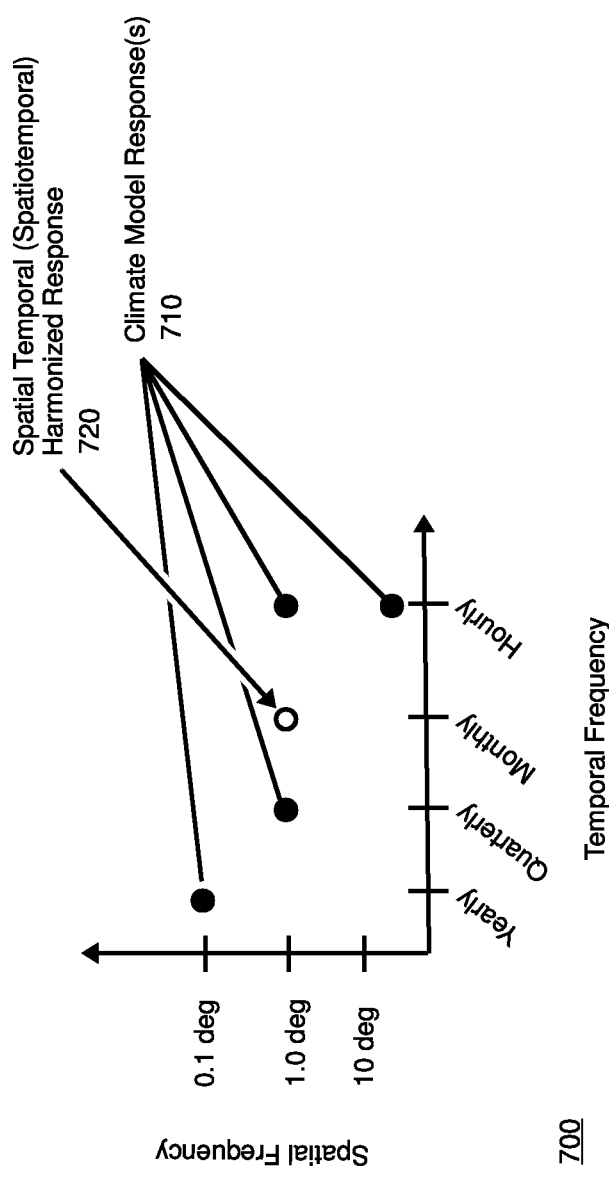
FIG. 7 is a drawing illustrating spatiotemporal harmonization process according to an embodiment.

The historic event catalog 220 and the active near real time risk event streams 225 are processed to produce past and present risk exposure maps at a specific spatial and temporal resolution (Spatiotemporal Harmonization 230). FIG. 7 is a drawing illustrating spatiotemporal harmonization process 700 according to an embodiment. As shown, the spatial and temporal parameters of a number of climate model responses 710 are different. The harmonization process may be performed in various ways but mainly involves finding a common set of parameters in which to express the data. The target harmonization parameter may be selected to be an average, mean, median, or other statistical/mathematical function. Preferably, the selected parameter(s) are more easily or more precisely converted from the various parameters of the climate model responses and consist in some manner the ultimate resolution (e.g., super resolution) to which the climate model data will be parlayed into hazard maps. Here, the illustrated climate model parameters have been harmonized to the Spatial Temporal (Spatiotemporal) Harmonized Response 720.

Using the high resolution hazard exposure maps (H'ij) and past and present risk exposure maps (Spatiotemporal Harmonization 230), a translation function is performed, mapping observed hazard events with projected hazard events using data from the hazard exposure maps to a sample set of asset locations (Spatial Test Sample 235). This translation function is the spatiotemporal learning engine 240 and may be performed across multiple (or all) hazard maps and compared to known results to determine which parts of the model contribute most accurately for any given set of conditions for those locations. The output of the learning engine is a calibrated model (Asset Level Exposure Sampling and Risk Estimation 250) that can use the projected high resolution risk exposure maps (H'ij) to assess the risk on a set of assets (Asset Loc. Dataset 245) provided by the user to generate risk valuation datasets. The risk valuation datasets can then be grouped by asset types, asset locations and by risk exposure severity (e.g., Grouped Risk Valuation Datasets 255).

Climate models provide an effective set of tools for quantifying and assessing the impact of climate change on acute physical risks like wildfires. This allows geodata scientists to assess future risk exposure trends, identify regions with high risk and quantify the benefits of carbon emission scenarios on mitigating climate change. However, current climate models and risk exposure models from CMIP6 (REF) have spatial resolutions in the range of 0.25 deg to 2 deg. Increased fire hazard in recent years from wildfires has highlighted the need for localized and region specific fire risk assessments to quantify economic impact, design future planned development and implement climate adaptation measures. Enhanced spatial resolution on these risk exposure maps makes them more indicative of asset-level risk exposure for historic (observed) and forward looking (predicted) time horizons (current conditions, near term, & future). This enables improved quantification of potential economic impacts of physical hazards climate change.

Super Resolution is used for resolution enhancement, for example as described above and may be further applied in super resolution of various environmental and climate projections, such as wildfire projections. For example, in one embodiment, which may be referred to as FireSRnet, a novel SR architecture operating may be provided on a multimodal novel dataset that accounts for temperature deviation and land cover burnability as primary geoscience drivers for wildfire risk/exposure estimation. The FireSRnet system performance may be benchmarked, calibrated, and validated in different regions with different environmental conditions (e.g., different climate zones, different areas within a zone, similar zones in different areas, etc.). In this manner, FireSRnet can enable more precise forward looking estimates of wildfire risks based on the outputs of the state of the art climate models for any particular area, region, or zone.

Active fire monitoring products like the MODIS Active Fire Archive (MOD14A1) provide an indicator of burnt area at a spatial resolution of 0.1 degrees (~11 km at the equator). Existing and emerging climate models past part of the IPCC CMIP (AR6) enable monthly and annual estimates at monthly and annual cadence over low spatial resolutions of 1.5 deg (~167 km at the equator). Critical decision making amongst rescue operations during wildfires and forward looking decision making towards climate adaptation amongst planning of cities and new development, underwriting of insurance policies and assessing risk and resilience of global supply chains may take advantage of wildfire exposure assessments and projections at higher spatial resolution at global scales. Enhanced spatial resolution is therefore highly desirable towards making such wild fire datasets indicative of asset level risk exposure for historic (observed) and forward looking (predicted) time horizons. Most resolution enhancement has been largely focused on real world visual imagery and less on spatiotemporal geospatial datasets.

Super resolution (e.g., Super Resolution 215, a resolution enhancement model) uses additional data inputs (e.g., Auxiliary Spatiotemporal Datasets 213) in addition to the fire exposure maps. These additional data inputs are, for example, contributing factors to high fire risk like vegetation or land cover types and monthly average temperature anomaly over pixel-defined spatial extent. Herein is described how the dataset was created, designing an effective and efficient learning model, criteria placed on evaluating the performance of the resolution enhancement and qualitative assessment of the model over specific regions. Although mainly described herein with respect to fires, similar development process and application may be applied to other climate related events.

To simulate burned area at each location, fire models incorporate factors such as temperature, precipitation, land cover type, and population. Relationships in the models can be quite complex, such as with population, where increased population in remote areas leads to increased likelihood of fire, yet in urban areas it leads to stronger suppression and thus lower area burned for a given fire event. It is important to note that the fire models may struggle to simulate the scale of historically unprecedented fires, such as the 2019 wildfires in New South Wales, Australia.

The 3 channel input format for the U.S. and AUS. 0.1 as the high res. 2000-2019 (2020 in validation sets) (regridded) Fire Counts We use a monthly fire data product provided by the National Aeronautics and Space Administration (NASA) based on imagery from their Terra and Aqua satellites (MODIS reference). NASA's global fire data product indicates the number of fires within a given pixel each month and is available beginning March 2000 continuing through to present day (August 2020) at 0.1 deg (roughly 11 km at equator) spatial resolution. Due to data quality concerns, we do not include March to May 2020 in this analysis.

A burnable land index input channel based on high-resolution, satellite-derived land cover data with values ranging from 0 (not burnable) to 1 (burnable). The 300 m resolution land cover dataset created by the European Space Agency's Land Cover Climate Change Initiative (10) assigns each pixel to one of 38 land cover classes based on 2015 satellite imagery. To make these land cover classes more scientifically relevant to the task of fire prediction, we binned each of the classes as either burnable (e.g. forest land cover types) or non-burnable (e.g. wetland).

This geoscience-driven binning was the same for the US and Australia with the exception of grassland and shrubland classes, which we classified as non-burnable and burnable for the USA and Australia, respectively based on visual analysis of wildfire patterns in both regions, where AUS experiences large bushfires generally absent in the US for equivalent classes. We then down sampled the resulting binary map from 300 m to 0.1 deg using bilinear interpolation, resulting in a global burnable land index map ranging from 0 to 1. We assume that the 2015 land cover classes, and thus the burnability index, is consistent across years evaluated in this study. The burnable land index is time-invariant in part because land use change at the spatial scales considered here, at least over the continental US, has been relatively minimal during the study period (14,15).

We expect temperature to be a key indicator of fire risk, so we derived a monthly temperature index input channel using high-resolution temperature data for the US and Australia. For the US, we use 4 km resolution monthly temperature data provided by the PRISM group (9). For Australia, we use 5 km resolution monthly temperature data provided by the Australian Bureau of Meteorology (11). Instead of using raw monthly temperatures as an indicator of fire risk, we developed a monthly temperature index corresponding to temperature anomalies. We expect temperature anomalies to be a stronger indicator of spatiotemporal fire risk since fires exhibit a great deal of seasonality (ref). To derive this index, for each grid location we calculated monthly anomalies relative to the 2000-2019 mean temperature at the corresponding grid location. We then up-scaled the resulting temperature anomalies to 0.1 deg using bilinear interpolation for consistency with the fire count spatial resolution.

Climate models are tools for climate scientists and the broader community to quantify future climate change risks around the globe. Climate models, typically comprising hundreds of thousands of lines of code, translate inputs like carbon emissions, solar activity, and land cover properties into gridded projections of meteorological variables and processes across the globe.

The development and standardization of climate models from major research centers is overseen by the World Climate Research Program, with the most set of experiments comprising the Coupled Model Intercomparison Project phase 6 (CMIP6) (CMIP6 has Climate Model variables). A model of, for example, future fire risk using climate model simulations of monthly fire burned area and temperature from the Centre National de Recherches Météorologiques Earth System Model version 2.1 (CNRM-ESM2.1) CMIP6 model, which does not allow for fire on cropland and pastureland.

To calculate the FireSRNet temperature anomaly index, we use both historical simulations spanning 2000 to 2015 and future simulations spanning 2016 to 2100 from the "Fossil-fueled Development" SSP5-RCP8.5 carbon emissions scenario, the scenario most consistent with current carbon emissions. The spatial resolution of CMIP6 climate models range considerably, from 0.5 to 2.5 deg resolution. The CNRM-ESM2.1 model has a spatial resolution of 1.4 deg, which is downscaled to required resolutions using bilinear interpolation. Bilinear interpolation may be used to convert CMIP6 data to consistent spatial resolutions.

Multiple approaches have been developed in the last few years around SR on color imagery. While the majority of such efforts focus on imagery of natural and man-made objects, the present context is super resolution of geospatial data on climate and, for example, on wildfire risk exposure maps.

Figures 3, 4A:
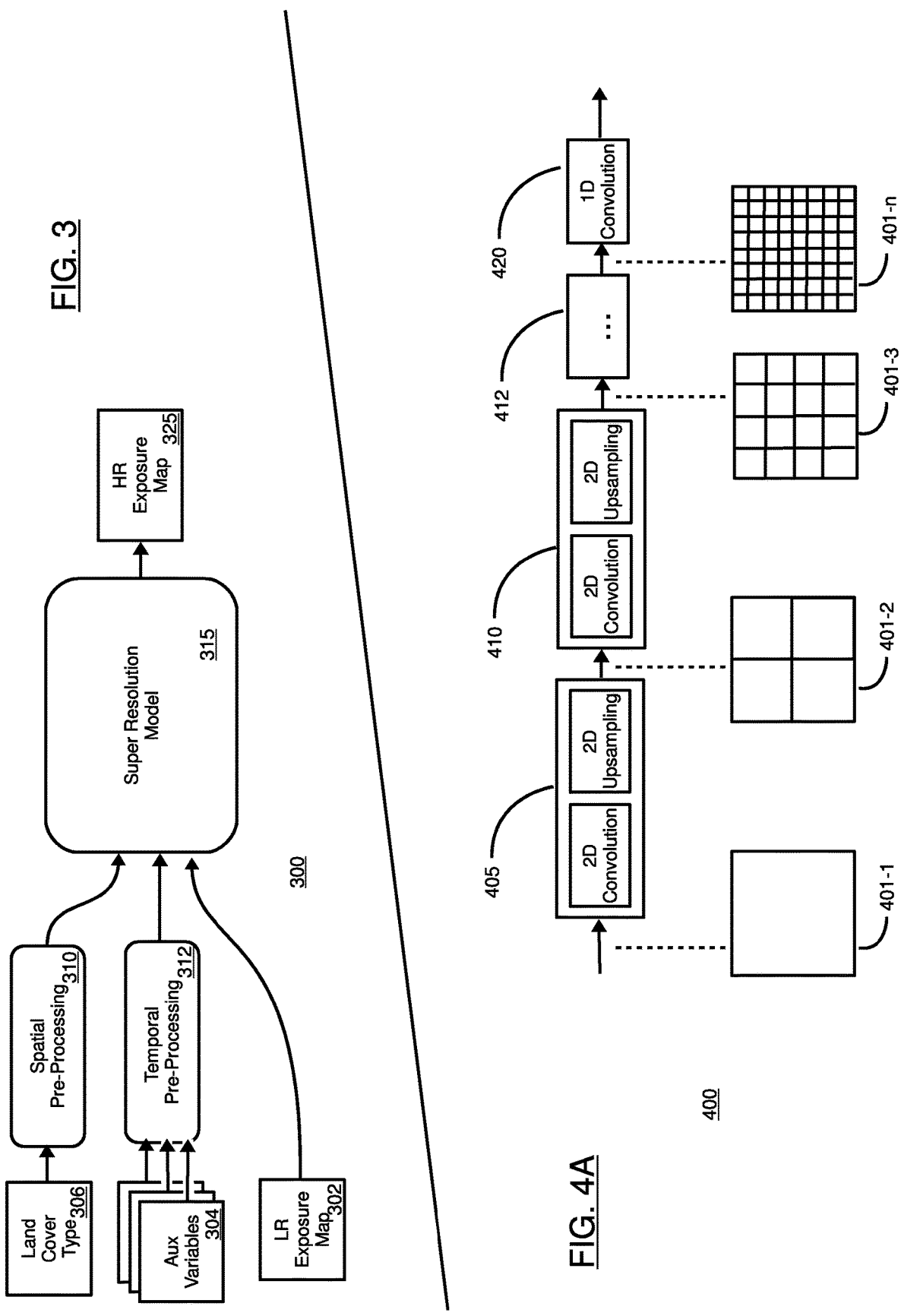
FIG. 3 is a drawing of a super resolution process according to an embodiment.
FIG. 4A is a super resolution model according to an embodiment.

FIG. 3 is a drawing of a super resolution process 300 for production of a high resolution Exposure map 325 according to an embodiment. A land (or environment) description (e.g. Land Cover Type 305) is provided which may include, for example a detailed high resolution set of data describing the land, such as type of ground cover (deciduous, pine, scrub, grassland, etc.) for an area. The illustrated example, Land Cover Type 306, may be, for example, what the land cover currently is. For some near-term future projections, the land cover may be a projection of next season (or later this season) what the land cover is expected to be, alternatively, such projections may be taken into account as Auxiliary data, or as initial conditions, for example. Pre-processing 310 may be performed such that the spatial density or resolution matches, is consistent with, or multiple of, for example, a desired end resolution, and then provided to the Super Resolution Model 315.

Auxiliary variables 304 may be provided on a number of different data types, such as, those discussed elsewhere herein for example, and temporally preprocessed 312, such that the timing of the data matches other data being super resolved and is then provided to the Super Resolution Model 315. A Low Resolution Exposure Map 302, such as any of exposure maps 212, or others is provided to the Super Resolution Model 315.

In one embodiment, Super Resolution Model 315 up-samples the Low Resolution Exposure Map 302 such that its resolution ("pixels" per area) matches a resolution of other inputs and the Super Resolution Model 315 matches or adds data from the other inputs to the up-sampled LR Exposure Map to produce the output High Resolution Exposure Map. In one embodiment, the up-sampled LR Exposure Map 302 does not add any significant data but provides a placement of corresponding Auxiliary variable or Land Cover (e.g., placed via convolution), for example. In another embodiment, an averaging or filter process may be implemented such that the up-sampled LR Exposure map has different information compared to a same map point in the LR and up-sampled versions. In yet another embodiment, different filtering options may be imposed in the upscale process, and such options may be selected, for example, based on any of land contours or land attributes or other environment factors. The selection of filtering may change based on latitude or climate zone, for example. Such filtering may be automatically selected based on the LR Exposure Map data, land cover data, other auxiliary variables or a combination of any of the above.

Based on the described data set creation techniques, with the downscaled high resolution dataset from satellite observations and with land cover maps and temperature measurements as inputs to our wild fire super resolution model and the original high resolution dataset from satellite observations as the output. Since we are using the monthly composites of recorded observations over the last 20 years, our datasets are of limited size for specific regions. For example, over the continental USA, we have a dataset of size 248 images of size 256×584 (at 0.1 degree resolution).

A similar sized dataset is available for continental Australia. Since these datasets are small, we prioritized trying out efficient and performance learning architectures that allow for building an understanding of the underlying SR approach, interpretability of results at specific test regions, attempted generalized performance over different regions with varied terrain, land cover and temperature dynamics. We attempted to achieve these goals through a model with ability to train and learn on these relatively limited size datasets.

FIG. 4A is a super resolution model according to an embodiment. A super resolution process 400 comprises interleaved 2D up-sampling layers and 2D convolutional layers (e.g., 405, 410). 412 representing multiple additional up-sampling and convolution layers. Variable size filters may be utilized. For example, in one embodiment, progressively smaller 2D filters of size 9×9, 5×5 and 3×3 sizes in the first, second and third 2D convolutional layers respectively with interleaved 2D 2× up-sampling layers. With each layer the resolution increases as shown 401-1 through 401-*n*, for example. The last stage, 420, uses a 1×1 convolution to combine learnings from multiple features maps to a single image at the target resolution. For the 2D convolutional layers, 'relu' activation may be used with the same padding. For the up-sampling layers bilinear interpolation may be used. Various other filter and interpolation methods may also be used.

In one embodiment, with the number of layers in this network, a total of 7.7K trainable parameters which can be trained from scratch using the dataset. This model can be extended across different scales (e.g., 2×, 4×, and 8× super resolution) and performance may be benchmarked on wild fire risk exposure maps. In one embodiment, a same or similar number of convolutional layers and trainable parameters across the three different super resolution scales may be utilized for assessment.

Since one goal of super resolution on risk (or hazard) exposure maps is to preserve the accuracy and fidelity of the risk exposure and less about visual and perceptual consistency, optimization is for minimization the mean square error. The year of the fire risk set may be used to determine if it is part of the training or the test set. In one embodiment, an 80/20 split, wherein the fire exposure from 2000-2016 is used for training and the fire exposure from 2017-2020 for qualitative inference and quantitative assessment of the model performance. Layer 1 weights post training result may be in a combination of spot detectors, offset spot detectors, spot eliminators and sharpening filters, indicative of essential functions at the early stages of the network to transform the lower resolution inputs and enable downstream feature maps that are indicative of discriminating features for fire detection.

Figure 4B:
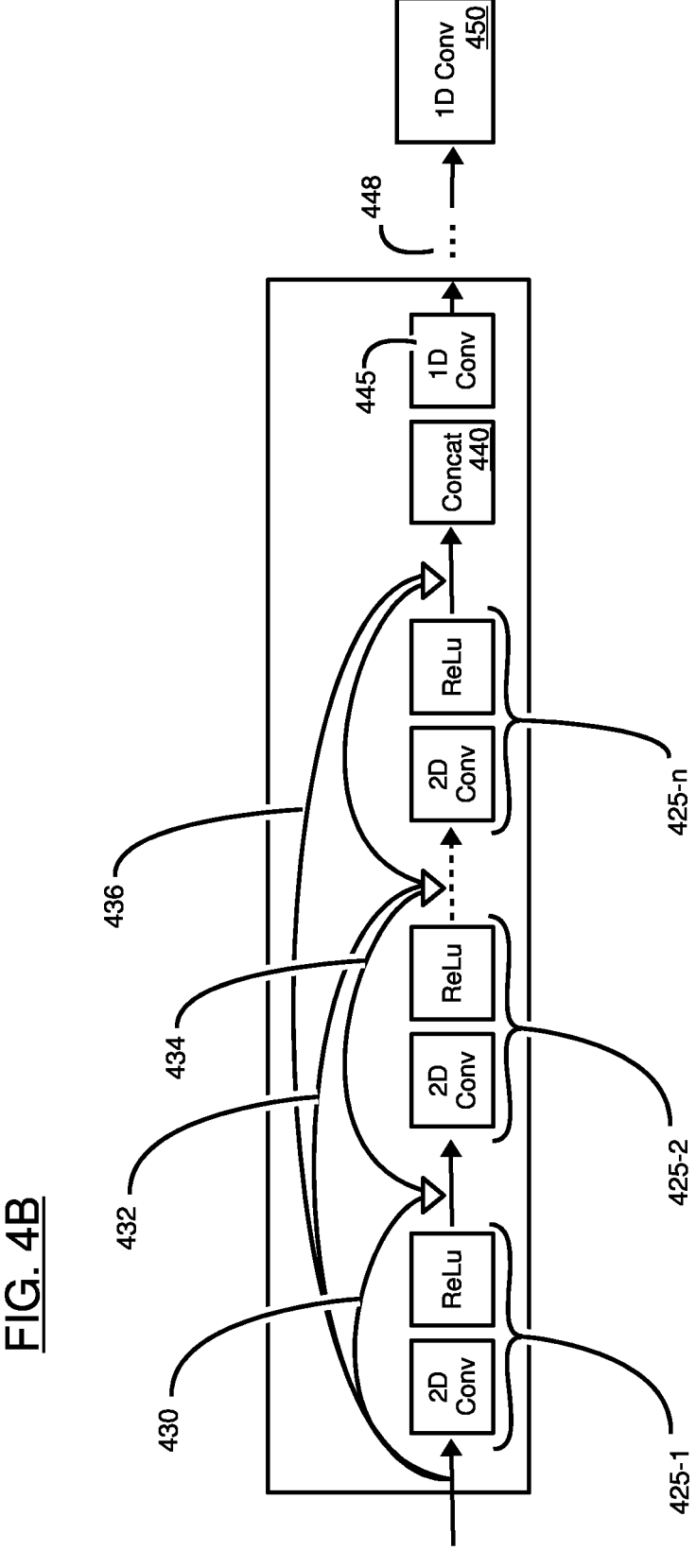
FIG. 4B is a $2^{nd}$ super resolution model according to an embodiment.

FIG. 4B is a $2^{nd}$ super resolution model according to an embodiment. FIG. 4B presents an alternative model architecture that uses residual connections instead of up-sampling layers to create residuals based super resolution architecture. Each residual block consists of three stages of stacked 2D convolutions, rectified linear activation (425-1, 425-2, 425-$n$(3)) which are concatenated (as shown in FIG. 4A, both the input to and output of one stage—e.g., 425-1—are input to the next stage, and so on —430-436) with residual connections 440 followed by a 1D convolution 445. A combination of residual blocks are used for single image super resolution.

Figures 4C, 4D:
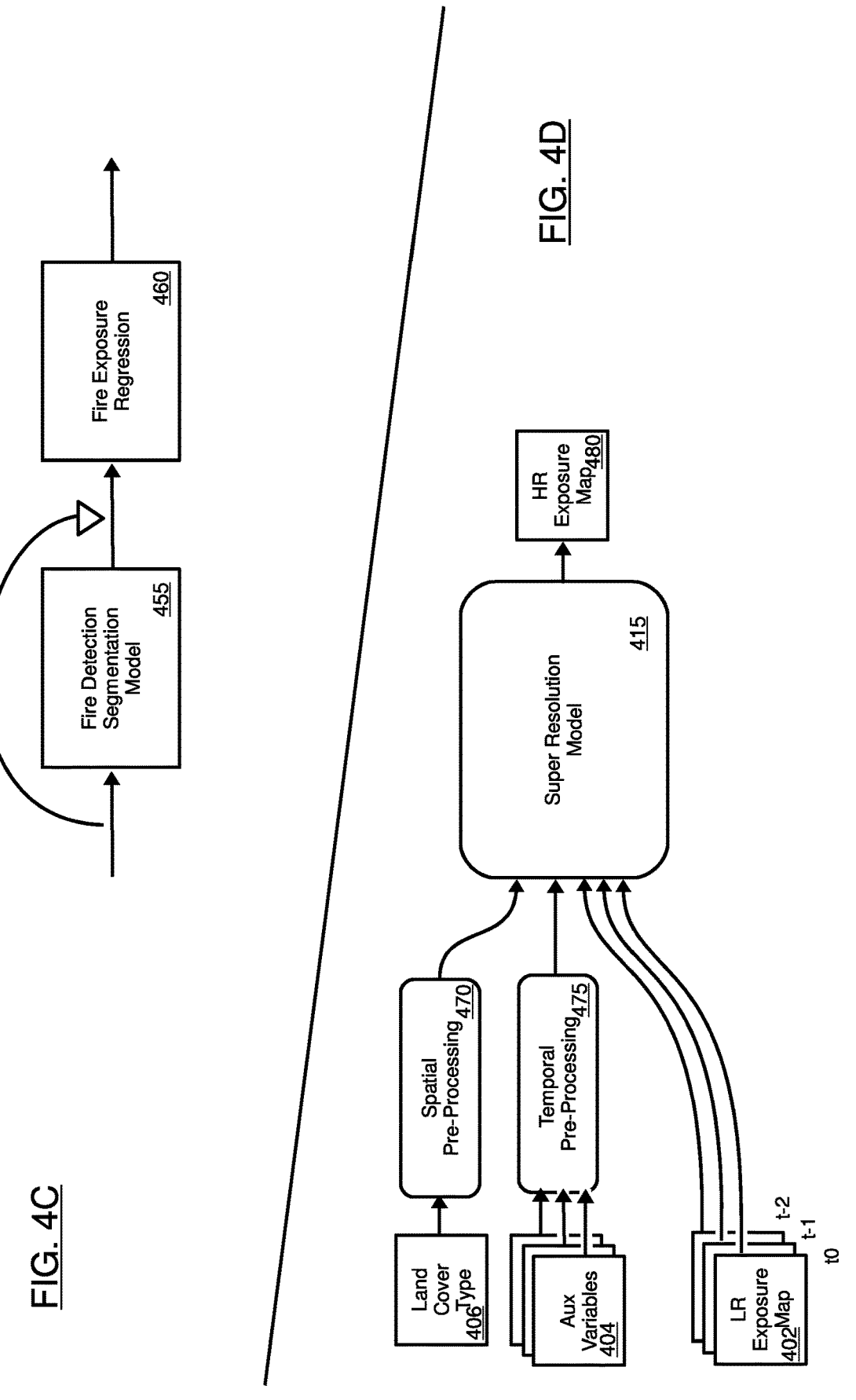
FIG. 4C is a $3^{rd}$ super resolution model according to an embodiment.
FIG. 4D is a $4^{th}$ super resolution model according to an embodiment.

FIG. 4C is a $3^{rd}$ super resolution model according to an embodiment. FIG. 4C indicates a variant of this approach to super resolution which accounts for zero inflated fire detection. We use a combination of segmentation for fire exposure detection at the pixel level at high resolution 455 followed by regression 460 to estimate the level of exposure at pixels where fires are detected.

FIG. 4D is a $4^{th}$ super resolution model according to an embodiment. FIG. 4D indicates a variant of the described approach to using low resolution exposure maps from different time points 402 as inputs to the super resolution model. These are considered as additional image channels to the super resolution model 415 and the processing may follow the same or similar steps as described in the variants above in FIGS. 4A, 4B, and 4C to produce high resolution (super resolution) exposure map 480.

Figure 5:
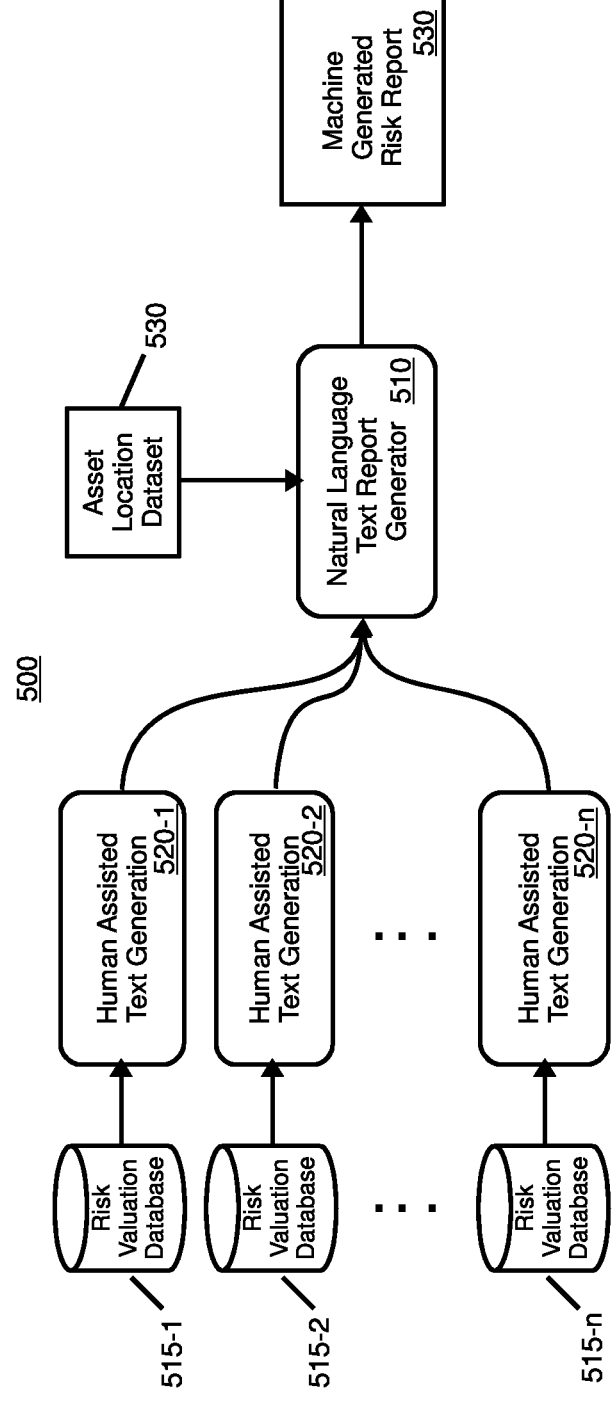
FIG. 5 is a drawing of a domain specific process according to an embodiment.

FIG. 5 is a drawing of a domain specific process according to an embodiment. FIG. 5 indicates an AI driven approach to reporting. Using the risk valuation data 515-1 . . . n from the system and human assisted textual descriptions 520-1 . . . n of the risk for asset collections, a Natural Language Text Report Generator 510 is trained to learn natural language descriptions of the risk data. For every specific domain of users or user group, the natural language based report generator 510 will learn domain specific terms used to describe the risk. This allows the system to auto-generate text based risk reports for a specific asset location data 530 to create machine generated risk reports 530, automated alerts, text messages, etc.

Figure 6:
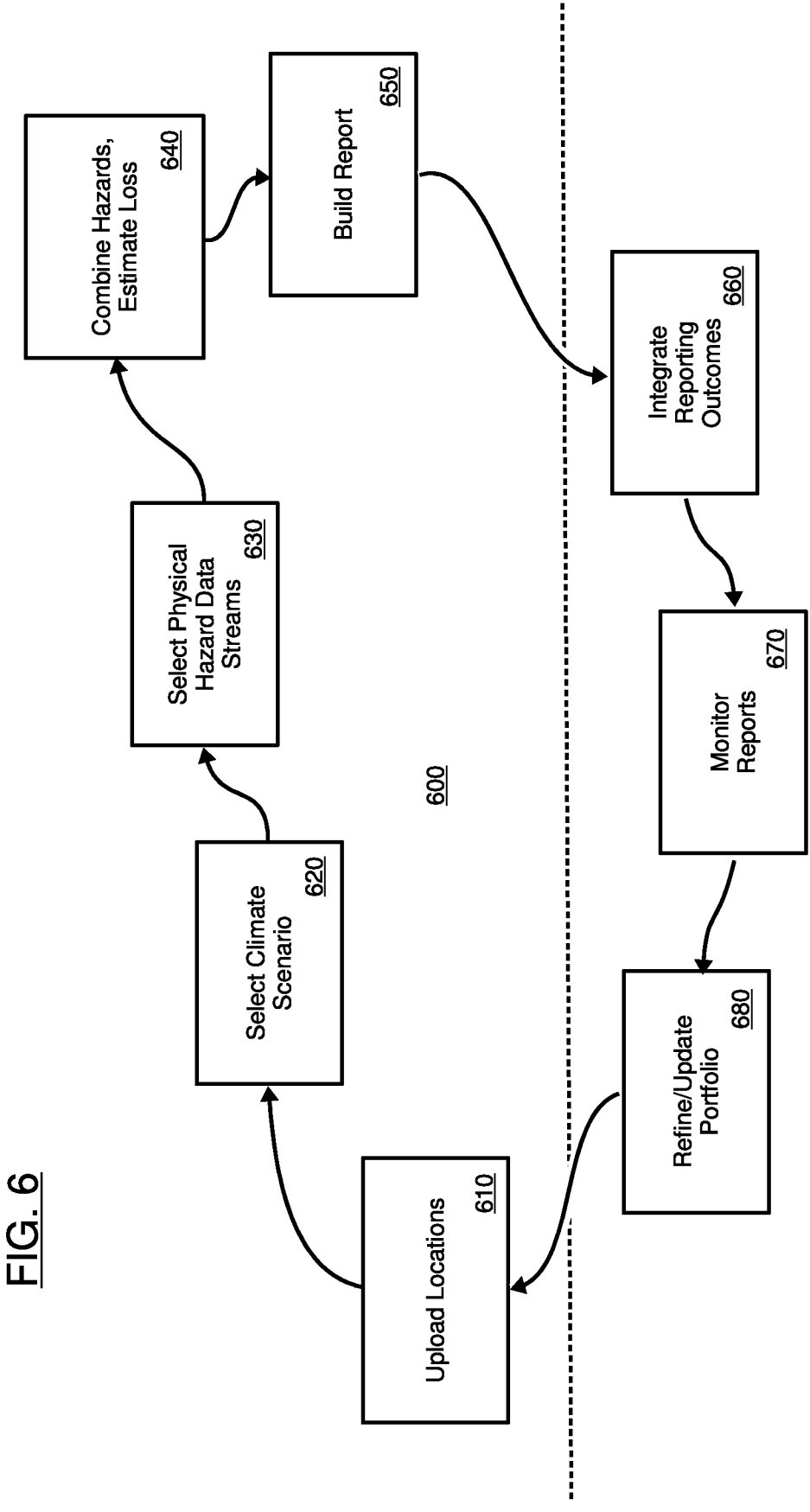
FIG. 6 is a diagram of a workflow according to an embodiment.

FIG. 6 is a diagram of a workflow according to an embodiment. FIG. 6 describes the user workflow 600 using the system described above. A User uploads a collection of asset locations of interest 610 to the climate intelligence platform. The platform allows the user to select scenarios and hazards of interest for assessments 620. The user can also choose a combination of multiple hazards for assessment 630. The platform performs the analysis and returns data, reports or visualization of the scenario dependent risk exposure to singular hazards or groups of hazards for a specific asset collection 640. A report 650 is generated by an analyst and or machine generated as discussed above. The user action may be, for example, an interaction with a website, and the report may be provided in a return email, displayed on the user's website, and/or provided in a text alert. Future changes or updates to the report may also be sent via an alert, text, or on a subsequent user login. The user's account may include preferences for how the reports are delivered and whether or not updates are desired, and allow the user to upgrade his/her subscription such that services at a higher level, if desired, may be subscribed (e.g., updates, update alerts, etc.)

The user may then integrate the report into action 660, such as putting procedures in place or taking proactive measures to guard against any high probability hazards or warnings (680). Such measures may be automatically invoked as discussed above and such automated actions may be invoked via APIs or other communication means available to the system that interface into the user's asset or related functions. The user may monitor any reports 670 and evaluate the results of the scenario analysis and then repeats the assessment using the modified portfolio of assets.

Accordingly, many embodiments may be constructed according to these and other teaching herein. For example, A method for automatically preparing and applying a climate model to physical assets, comprising the steps of, obtaining a first set of climate data at a defined resolution, obtaining a timed or synchronized data file of a second set of climate data different from the first set of climate data and at a higher resolution compared to the first set of climate data, generating a stream of output morph data items corresponding to each pixel at the higher resolution by interposing the second set of climate data at timed or synchronized up sampled pixels of the first set of climate data, spatially and temporally harmonizing a catalog of past climate events and a stream of current or near term climate conditions, determining patterns and probabilities of events based on a combination of the higher resolution stream of output morphed data items and the harmonized catalog, and using the patterns and probabilities to allocate resources to move or bolster physical assets at locations pixels corresponding to the physical assets where the patterns or probabilities indicate risk above a predetermined threshold. In one embodiment a set of physical assets at a location or facility are identified as at risk and individual instructions are presented (e.g., simultaneously) to corresponding contractors for each asset with instructions to bolster the asset along with an indication of the potential threat (e.g., rain, flood, wind, etc.). In one embodiment, the individual instructions are presented to contractors in an order that reflects a known or predicted time to secure or bolster the asset.

For example, a method for automatically preparing and applying a climate model to physical assets, comprising, obtaining a first set of climate data at a defined resolution, obtaining a timed or synchronized data file of a second set of climate data different from the first set of climate data and at a higher resolution compared to the first set of climate data, generating a stream of output morph data items corresponding to each pixel at the higher resolution by interposing the second set of climate data at timed or synchronized up sampled pixels of the first set of climate data, generating a spatially and temporally harmonized a catalog of past climate events and a stream of current or near term climate conditions, training a learning engine based on the generating a stream of output morph data items and catalog, using the trained learning engine to estimate an amount of risk to an asset based on the morphed data items and asset location, and using the amount of risk to initiate a an automatic and corresponding amount of remedial/protective measures to guard against damage to the asset and/or downstream damage caused by loss of the asset. For example, damage to an infrastructure asset such as power line further damages life support systems downstream at hospitals and farms.

The morphed data items may comprise a base value from the first resolution data and one or more values from the second resolution data. The second resolution data comprises more than one data item spatiotemporally harmonized with the first resolution data. The first resolution data may be up-sampled and filtered to higher resolution. The filter may change across pixels of the up-sampled higher resolution data. The stream of output morphed data may comprise a super resolution of pixels of the climate data. The asset may comprise a municipal or municipal reliant facility such as a power plant, water system, pipeline, data center. The risk may comprise fire damage or other hazard. The risk may comprise downstream damage from a primary facility damage or incapacity. The asset comprises housing. The assets and/or risk assessment products may be grouped into categories such as apartments, single family residences, and industry.

The methods may be applied to a series of assets at different locations worldwide and remedial measures are applied to the assets on a rate of return basis. The methods may be applied to a series of assets at different locations worldwide and remedial measures may be applied to the assets on a cost basis such that the most amount of resources are spent on the assets with the greatest cost risk. The most expensive assets may already have sufficient protective measures in place and the most cost effective protective measures moving forward are at lower value facilities. The method may be applied to a series of assets at different locations worldwide and remedial measures are applied to the assets on a rate of return basis.

The protective/remedial measures may comprise temporarily shutting down a facility. The protective/remedial measures may be instituted before the climate event is a certainty. The protective/remedial measures may be ordered by the system with enough lead time to implement the measures before the potential climate event occurs. The protective/remedial measures may comprise breaking up functionality of a single facility into a set of lesser physically distant facilities. The physically distant facilities comprise facilities in different climate zones. The allocation of resources may comprise allocating resources weighted according to a risk value paradigm that provides a higher allocation to assets with a higher value and/or a higher amount of risk.

In one embodiment, a method is provided for predicting a climate risk, the method comprising, building or receiving, by one or more computer processors, a collection of historic data related to climate for an area, building or receiving, by the one or more computer processors, a risk stream related to the area, building or receiving, by the one or more computer processors, at least one risk projection related to the area, building, by the one or more computer processors, a Climate Intelligence Platform configured to super-resolve the risk stream and the risk projection with the historic data to produce a risk exposure map for the area. The Climate Intelligence Platform may be configured to upscale one or more of the risk stream(s) and risk projection(s) to match a resolution of the historic data. The historic data may comprise, for example, a spatial land cover map. The method may further comprise the step of building, by the one or more computer processors, a report based on areas of the risk exposure map corresponding to a company asset or infrastructure. The infrastructure may be, for example, a power line, utility, or other asset.

Another embodiment provides an infrastructure risk exposure prediction system, comprising, a processing device and a non-transitory, processor-readable storage medium, the non-transitory, processor readable storage medium comprising one or more programming instructions thereon that, when executed, cause the processing device to: receive a plurality of risk streams related to a geographical region, the plurality of weather forecasts having spatial and temporal information; receive a plurality of risk projections related to the geographic area; super-resolving at least one of the risk streams and risk projections with a land cover; and identifying a risk associated with an infrastructure or asset in the geographic area. The identification may comprise, for example, preparing a map of the super-resolved land cover at a location of the infrastructure or asset.

The risk projections may comprise a climate change projection, such as a projection into the future (e.g., a year, 2-years, 5-years, 10 years), for example, a projection more than a year into the future. The risk projection comprise a projection on the order of a decade into the future. The risk projection may detail projections from today to a decade or more into the future.

The method may further comprise hardening the asset or infrastructure based on risk exposure identified in the map. The hardening the assets may be performed, for example, in order of relative risk and cost in the event of a hazard identified by the map. Assets or infrastructure may be hardened in order of relative risk, cost, and immediacy of the exposure.

The low resolution risk exposure map of the geographic area and the super-resolving may comprise, for example, a series of convolutions and up-sampling events that align the land cover at a same resolution. The method may further comprise the step of applying an operational mask. For example, further comprising applying an operational geophysical mask to the exposure map.

In yet another embodiment, the present disclosure provides generating a risk exposure forecast, the method executable by a server, the server including a processor, the processor configured to execute a Machine Learning Algorithm (MLA), the method comprising, training the MLA with historical land cover data for a first geographic region, risk streams associated with the land cover in the first geographic region at the time of the historic data, and risk projections comprising a climate change risk projection for the first geographic region at the time of the historic data, to produce a result consistent with the known weather patterns or events having occurred in the first geographic region in the same time frame(s) of the historic data; receiving, by the trained MLA at a given period of time, an indication of land cover data for a second geographical region, at least one aux variable comprising a spatial rendering of the aux variable, and a low resolution exposure map comprising at least an indication of climate change exposure for the second geographical region; super-resolving the low resolution exposure map and the land cover map comprising a convolution and upscaling process and further comprising a predictive element comprising past climate change risk projections as trained; and preparing a risk exposure map for the second geographical area based on the super-resolved land cover mask.

The risk projection may comprise, for example, a climate change prediction. The risk projection may comprise, for example, a plurality of climate change predictions for different climate variables (temperature, precipitation, etc.).

The disclosure provides a method of asset protection comprising, applying an asset location to at least one high resolution exposure map to determine an amount of risk to an asset. The high resolution exposure map may comprise a super resolution version of a lower resolution hazard exposure map. The lower resolution hazard exposure map may be based on an existing climate model. The lower resolution hazard exposure map may be a super resolved via up-scaling to high resolution and applying (e.g., convolving) auxiliary spatiotemporal climate data. The at least one high resolution exposure map may comprise a collection of high resolution exposure maps super resolved from a collection of lower resolution exposure maps derived from a climate model for a plurality of hazards. The at least one high resolution exposure map may comprise a plurality of collections of high resolution exposure maps super resolved from a plurality of collections comprising lower resolution exposure maps. The lower resolution exposure maps in a collection for a hazard (or a plurality of hazards) and derived from a set of models. The models may comprise commercially available climate models.

The auxiliary spatiotemporal climate data may comprise a contributing factor to a climate related event. The auxiliary spatiotemporal climate data may comprise at least one of vegetation, land cover type, and monthly average temperature anomalies. The auxiliary spatiotemporal climate data comprises at least one of temperature, dryness, wetness, rainfall, land surface type, and altitude. Various outputs or actions may be applied based on results, for example, if the risk is above a predetermined threshold, then applying automated remediation measures to reduce the risk. The threshold of risk may vary relative to value of the asset.

The present disclosure provides a super-resolution climate device comprising, an input mechanism configured to receive a set of hazard model collections, a harmonization module configured to simulate models of the hazard model collections to produce a corresponding set of hazard map collections, a super resolution module configured to upscale a resolution of the hazard exposure maps and apply auxiliary spatiotemporal datasets to the up-scaled hazard exposure maps, and an asset level evaluator configured to estimate risk posed to an asset based on its location and the super resolved hazard exposure maps. The asset level evaluator may retrieve climate data from the super resolved hazard exposure maps based on the asset location. The climate device may further comprise an advice module that prints out a report about the severity of an upcoming climate or climate induced risk relative to assets and/or an action module that signals a shutdown, back-up, or a climate event preparation alert to asset facility operators. The action module may start at least one of a shutdown, back-up, or other disaster preparation.

The present disclosure also provides a super resolution module comprising, an input for Spatial pre-processed land cover type, an input for temporal pre-processed auxiliary variables, an input for a low resolution hazard exposure map, an upscaling module comprising a filtered or filterless operation for up-scaling the low resolution hazard map, a convolution module configured to merge the up-scaled low resolution hazard map and the land cover and auxiliary variables data to produce a high resolution exposure map, and an output configured to output the high resolution exposure map for use in climate projection planning and asset preservation. The upscaling module and convolution module operate in tandem, repeatedly convolving 2D and then upscaling 2D until a desired resolution is reached. The upscaling module and the convolution module may operate in tandem, repeatedly convolving 2D and Relu, and then concatenating and 1D converting.

The present disclosure further provides a climate model service comprising, a web page displaying one or more parameters for activating a climate model, and an API connected to the web page such that the API receives one or more parameters for the climate model and invokes the climate model using the parameters, wherein the web page is configured to display results of the climate model invocation. The parameters may comprise an asset location and the results comprise an indication of risk from applying the asset location to a corresponding location on high resolution hazard exposure map.

The high resolution hazard exposure map may comprise a super resolution version of a lower resolution hazard exposure map. The super-resolution version may comprise an up-scaled hazard exposure map convolved with a high resolution climate related data source. The high resolution climate related data source may comprise auxiliary data of at least one of temperature, dryness, humidity, wetness, rainfall, land surface type, altitude, a contributing factor to one or more types of risk, vegetation, land cover type, soil, and temperature anomalies. At least one of the auxiliary data may comprise an integration of an auxiliary data over time. The auxiliary data is spatiotemporally harmonized with the high resolution hazard exposure map.

The service may be provided based on subscription. The service may be provided on a push basis where updates affecting one or more of a subscriber's asset locations are pushed to the subscriber. The pushes may be sent to the subscriber via one of a notification, email, text message, and hard copy letter such as overnight. The pushes may be sent to a plurality of stakeholders in a subscribing organization's personnel structure.

The present disclosure further provides learning system comprising a learning paradigm based on a super resolution of a hazard model at a first resolution and at least one auxiliary dataset of a second resolution higher than the first resolution. The learning system may be trained via comparison of the super resolution hazard model to spatiotemporal harmonized historic events and real-time conditions against a spatial test model. The trained learning system may be applied to evaluate a high resolution hazard exposure map with respect to at least one asset location. The hazard model may comprise a collection of hazard models of a base environment or climate. The learning system may be utilized to provide a model for asset level risk exposure decisions for an automated preservation/damage prevention action, such as backing up computer and/or network systems data. The system may be entirely dependent upon computer implemented instructions and processes without intervention of any mental process. The models may be fire exposure models. The hazard model may comprise a collection of hazard models. The collection of hazard models may comprise a plurality of models at a plurality of different times each super resolved according to a plurality of auxiliary spatiotemporal datasets.

The learning paradigm may comprise weighting various Hazard Exposure Maps or portions thereof based on the application historic and near real-time events compared to a test sample. The weighting may comprise at least one of matching conditions within an area of the asset to the asset location, matching conditions outside an area of the asset to the asset location, weighting results of the asset matching based on distance from asset location, weighting results of the asset matching based on environmental zone. The weighting may comprise weighting results of matching results based on environmental zone. The weighting may comprise at least one of a same zone match is weighted higher than another zone, a similar zone match is weighted higher than another zone; a similar close zone match is weighted higher than a similar distant zone match, a similar zone at a same latitude is weighted higher than a similar zone at a higher or lower latitude.

In addition to the super resolution techniques described herein, it is useful to filter the exposure maps with an operational mask, which may be, for example, an operational geospatial mask that relates or adjusts any of the qualities, risks, weather, or trends, for example, as it relates to specific points on the globe or pixels (or blocks) in, for example, the Exposure Map. A good example would be a land cover mask that accounts for factors such as vegetation density, drought conditions (or predicted drought conditions), length of time since a last fire and is configured to provide values for those parameters on, for example, a pixel-by-pixel basis (or other metric) of the Exposure Map.

Figure 8:
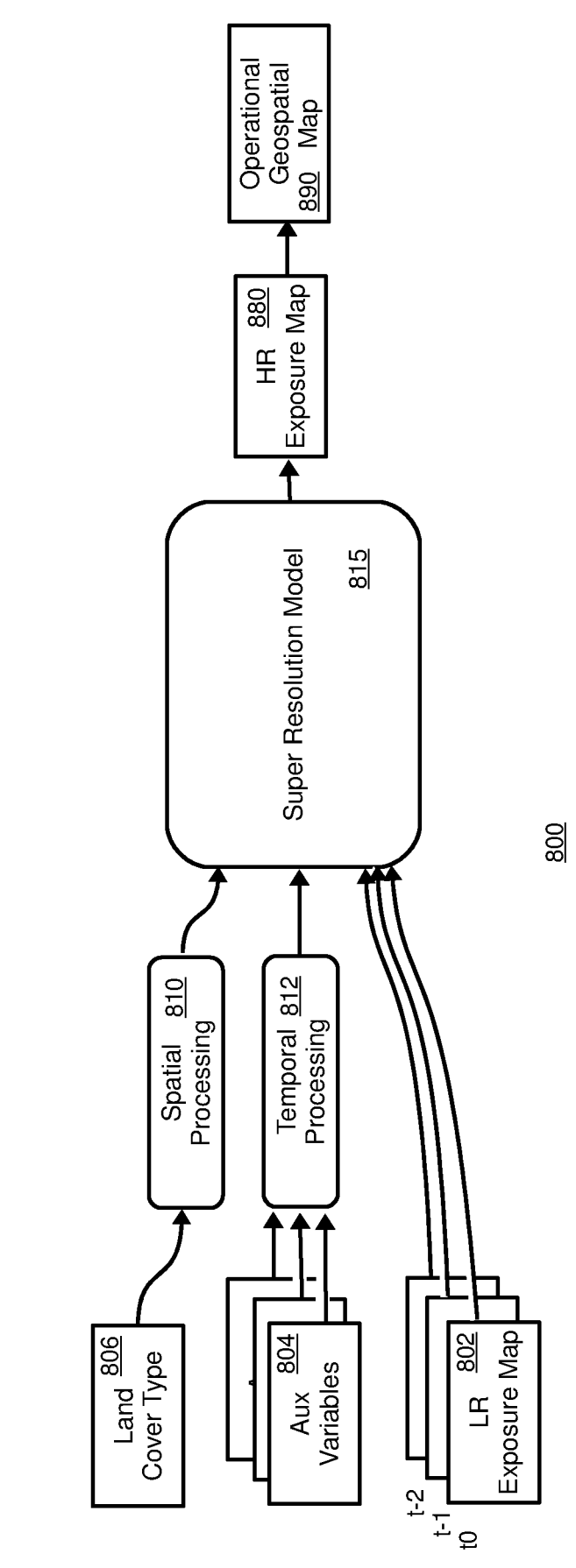
FIG. 8 is a diagram of a super resolution system (multi-image super-resolution) with land cover mask according to an embodiment.

FIG. 8 is a diagram of a super resolution system 800 (multi-image super-resolution) with an Operational Geospatial Mask, for example a land cover mask, according to an embodiment. FIG. 8 indicates a variant of the above described approaches wherein a mask, which may be singularly focused or multi-level on an Exposure Map (e.g., Exposure Map 880) built from processes similar to that described above (land cover type 806 and spatial processing 810, aux variables 804 and temporal processing 812, and the Low Resolution (LR) Exposure Map(s) 802, together used to form the Super Resolution Model 815 and producing the HR Exposure Map 880).

This mask (e.g., Operational Geophysical Mask 890) may have, for example, the same or higher resolution than the output from the super resolution model (HR Exposure Map 880) and can be used to determine regions for their vulnerability to acute physical hazards. For example, for wildfire super resolution, this could be a burnable land index mask. Each pixel on the mask can be indicative of the spatial region's vulnerability to wildfires. A vegetated or forested region with the right amount of biomass would be more prone to wildfires as compared to a desert. For a flood super resolution, this could be a digital elevation mask, each pixel on this mask can be indicative of the spatial region's vulnerability to flood. Low lying regions will be more prone to flooding as compared to an elevated region.

In another example, although some areas may be prone to flooding, rain contributing to flooding may have other effects including, for example, landslides whose risk may also be quantified or modified via a mask (e.g., related or ancillary risks). Further, since there is a relationship between flooding risk and some types of landslides, a high risk for flooding may also trigger additional consideration of landslides—which may be more or less depending on the source of the water (where it is coming from). Accordingly, the risk for landslide in a flood risk scenario may be more or less based on the water's source which may also be provided in a mask—and the mask may be adjusted based on current predictions of that (or those) source(s). Moreover, the present disclosure includes extrapolating one risk into predictions as to other risks and their severity which may have synergistic effects requiring more hardening of assets, structures, and/or infrastructure each affected similarly or quite differently depending on each assets unique characteristics. The masks themselves may be tuned to a specific assets known or project vulnerabilities.

Further, adjusting a mask based on trends (Global warming, frequency of extreme weather) or other predictions (such as water source). For example, the flood risk parameters of certain sources may be boosted to account for highly increased risk due to global warming, but other sources not as highly affected would see less or even no boost from the mask. The operational mask may account from more than one risk or, in another embodiment, different masks may be applied to produce different results which may be amalgamated, averaged or used independently. In one embodiment, risk assessment from different masks applied to a same HR exposure map are utilized by different agencies, different utilities, or different branches of an organization (e.g., such as those tasked with response or preparedness of the organization's equipment or infrastructure).

In another example, the operational mask may have different levels or degrees. For example, a fire mask may be modified (or adjusted) based on past fires that could be scaled based on length of time since a particular pixel (area represented by the pixel) was burned (provided on top of the vegetation mask, for example). The relationship to time may be adjusted depending on the area. For example, some areas burn, probabilistically speaking, at relatively consistent intervals over time and/or increased risk based on a level of vegetation/vegetation re-growth. The mask may be scaled based on length of time. Industrial or other development in an area may increase, decrease, or parse the risks. For example, a new highway through a forest may parse the risk into different areas, and increased human access to forested areas may add additional risk. A mask may further be a hybrid mask accounting for different factors—in one embodiment, factors in a hybrid mask may include both multiple increased risk factors and/or decreased risk factors (e.g., climate change induced above normal precipitation may have both increased and decreased fire risk over time). A pre-processor may be utilized to combine different masks on a pixel-by pixel or other basis (e.g., pixel blocks), for example.

In another example, an operational mask for flooding may be provided, which may have an inverse or reverse relationship compared to fires because past flooding (even recent past flooding) may be more likely an indication of increased future flooding (opposite of fires which will usually require some years for revegetation). Further, since weather is generally on trends such as becoming more extreme, operational masks can be plotted/extrapolated to show more or less risk based on the trend.

Although in many examples, the present disclosure in applying geo-environmental data, mapping, and resolutions, to prepare models and predictions which are allied to hard or physical assets—for example, in a system for protecting infrastructure such as equipment, utilities, etc. The present disclosure also includes the option of having hard assets in the models for predictions. For example, power lines, particularly in areas prone to fire either naturally, due to forest management, or climate change (all trends that may be reflected in the models and/or masks), the hard or physical assets themselves may be included or accounted for in the models or masks. For example, a hybrid mask comprising vegetative data in relation to nearby power-lines, which may be evaluated based on current wind conditions and stages of drought. Other factors accounted for in such masks may be age of a power line, power loading (e.g., variances, increases etc. over time), state of recent or projected maintenance, etc. Such evaluations may be provided or used to automatically turn power-lines off when a predetermined amount of risk/conditions occur, or prepare maps of most at-risk areas around power-lines providing a priority for maintenance activity such as arborist work clearing/trimming trees or other vegetation. In yet a further example, such analysis may provide data for the application of additional observation activities such as look-out towers, flights (e.g., drone flights) in the most at-risk areas. For example, identifying areas most at risk, and/or preparing an observation flight path across the most at-risk areas at the most at-risk times, initiating a flight based on the most at-risk areas. All such risk analysis may be for an immediate risk assessment or projected out over time (e.g., a series of masks adjusted for changing conditions) and used for planning preparedness, and/or allocation of resources where most needed or highest investment return.

Further, the various embodiments described herein may be practiced at a facility in the management of power (or other resource). In one embodiment, power is reduced or turned off based on a level of threat or risk identified. In one embodiment, a power company management facility includes remotely operable buying, selling, and general trading of power, and one or more embodiments may be utilized to initiate any one or more of those transactions automatically in real-time in the face of a power shut-off. For example, a power generation facility at risk from a wildfire may purchase options for out-of-state (or alternate facility) generated electricity as an insurance policy in the event of a shutdown and re-route that resource away from the at-risk area to its downstream customers in other areas impacted by the shut-down. For example, when conditions are identified as high risk, options may be purchased for both the near term and any estimated recovery time in the event of an adverse event or shutdown. Purchases may be automatic, for example, in planning stages before an event when identified as high risk, or on-the-fly as an event begins to register. The present disclosure includes an interface (e.g., computer interface) to facilitate transmission of a utility (e.g., electricity) purchase made to prepare or respond to an event, the interface transmits, for example, and amount of utility, a rate of utility, and/or a length of time (e.g., predicted longevity of the event). Such request may go to an operations center (e.g., electricity operations center) where it may be approved and routed, or immediately forwarded to the selling party's system. A level of checks (e.g., such as management approval) may be determined based on the severity or immediacy of the event. The present disclosure includes re-routing power distribution based on such automated purchases. Such re-routing may include, for example, routing electricity around a danger or event area, transmitting electricity to a location normally serviced by a utility source that has been shut down or impaired.

Trends or patterns may be recognized and, if, for example, over time, certain known threat (e.g., winds affecting power lines in certain areas on a regular basis) may tend to show shifts in wind patterns due to climate change or other factors. The trend may be identified and the preparedness team notified, that, for example, the threat is shifting in a southerly direction and expect in 10 years the main threat with be to the south and facilities in that area should be hardened or upgraded now.

The present disclosure further provides a method of protecting assets, comprising the steps of, determining a climate related hazard risk at an asset location, if the hazard risk is above a predetermined threshold, applying proactive measures to protect the asset. The climate related hazard risk may be determined via a super resolution of a hazard exposure map evaluated with respect to historic and active or near real-time events at the asset location and/or projections over time. The super resolution may comprise a super resolution of a plurality of hazard models. The plurality of hazard models may comprise the same hazard model at different times (temporally separated instances of the model). The plurality of hazard models may comprise a plurality of different hazard models. The plurality of hazard models may comprise a plurality of different hazard models related to fire. The plurality of hazard models may comprise a plurality of different hazard models at a plurality of different time frames. The method may further comprise the steps of, training a learning engine based on the hazard model or models along with historic and/or current events data with respect to test data, applying the trained engine to at least one asset location to determine an amount of risk at the asset location, and implementing a protective measure for the asset according to the amount of risk allocated to the asset location. The protective measures may comprise fire damage mitigation. The protective measure may comprise an automatically implemented damage mitigation. The protective measure may comprise making the asset more fire-resistant. The protective measure may comprise sending an alert displayed on key personnel mobile devices.

In one embodiment, a message formatted by a first system comprising a super resolution evaluation according to any of the above, communicated as an output through an interface and onto a network system for transmission and being received by a subscribing device through an input interface on or connected to the subscribing device along with an application or other mechanism for reading and displaying information contained in the message according to user preferences. The user preferences may include, for example, an alert notification, a chart (e.g., flood levels over time, fire distance/containment, etc.), links to actions needed to respond to any threats (contractors, public services, response teams, etc.), identification of contingency plans, a display of others notified, a display of response team(s) status, response team contacts, and other preparation/responses which may be mandatory according to company policies or suggestions for review and implementation if deemed appropriate.

In one embodiment, the present disclosure provides a method for automatically preparing and applying a climate model to physical assets, comprising, obtaining a first set of climate data at a defined resolution, obtaining a timed or synchronized data file of a second set of climate data different from the first set of climate data and at a higher resolution compared to the first set of climate data, generating a stream of output morph data items corresponding to each pixel at the higher resolution by interposing the second set of climate data at timed or synchronized up sampled pixels of the first set of climate data, spatially and temporally harmonizing a catalog of past climate events and a stream of current or near term climate conditions, determining patterns and probabilities of events based on a combination of the higher resolution stream of output morphed data items and the harmonized catalog, and using the patterns and probabilities to allocate resources to move or bolster physical assets at locations pixels corresponding to the physical assets where the patterns or probabilities indicate risk above a predetermined threshold.

In another embodiment, there is provided a method for automatically preparing and applying a climate model to physical assets, comprising, obtaining a first set of climate data at a defined resolution, obtaining a timed or synchronized data file of a second set of climate data different from the first set of climate data and at a higher resolution compared to the first set of climate data, generating a stream of output morph data items corresponding to each pixel at the higher resolution by interposing the second set of climate data at timed or synchronized up sampled pixels of the first set of climate data, generating a spatially and temporally harmonized a catalog of past climate events and a stream of current or near term climate conditions, training a learning engine based on the generating a stream of output morph data items and catalog, using the trained learning engine to estimate an amount of risk to an asset based on the morphed data items and asset location, and using the amount of risk to initiate a an automatic and corresponding amount of remedial/protective measures to guard against damage to the asset and/or downstream damage caused by loss of the asset.

In the various embodiments, and particularly those noted directly above, the morphed data items may comprise, for example, a base value from the first resolution data and one or more values from the second resolution data, and/or, the second resolution data may comprise more than one data item spatiotemporally harmonized with the first resolution data, and/or, wherein the first resolution data may be up-sampled and filtered to higher resolution, and/or, wherein the filter may change across pixels of the up-sampled higher resolution data, and/or wherein the stream of output morphed data may comprise a super resolution of pixels of the climate data, and/or, wherein the asset may comprise a municipal or municipal reliant facility such as a power plant, water system, pipeline, power line, data center, etc., and/or wherein the risk comprises fire damage, flood damage, or a combination (e.g., synergistic) thereof, and/or wherein the risk comprises downstream damage from a primary facility damage or incapacity, and/or wherein the asset comprises housing or infrastructure, and/or wherein the assets are grouped into categories such as apartments, single family residences, and industry, and/or wherein the method is applied to a series of assets at different locations worldwide and remedial measures are applied to the assets on a rate of return basis, and/or wherein the method is applied to a series of assets at different locations worldwide and remedial measures are applied to the assets on a cost basis such that the most amount of resources are spent on the assets with the greatest cost risk, and/or, wherein the most expensive assets may already have sufficient protective measures in place and the most cost effective protective measures moving forward are at lower value facilities, and/or wherein the method is applied to a series of assets at different locations worldwide and remedial measures are applied to the assets on a rate of return basis, and/or wherein the protective/remedial measures may comprise temporarily shutting down a facility, and/or wherein the protective/remedial measures are instituted before the climate event is a certainty, and/or wherein the protective/remedial measures may be ordered by the system with enough lead time to implement the measures before the potential climate event occurs, and/or wherein the protective/remedial measures may comprise breaking up functionality of a single facility into a set of lesser physically distant facilities, and/or wherein the physically distant facilities comprise facilities in different climate zones. In a related embodiment, regarding weighting, or, for example, other embodiments that may utilize weighting resource allocations, the allocation of resources comprises allocating resources weighted according to a risk value paradigm that provides a higher allocation to assets with a higher value and/or a higher amount of risk.

In one embodiment, the present disclosure provides a method of asset protection comprising, applying an asset location to at least one high resolution exposure map to determine an amount of risk to an asset. The high resolution exposure map may comprise, for example, a super resolution version of a lower resolution hazard exposure map. The lower resolution hazard exposure map may be based, for example, on an existing climate model. In one alternative, the lower resolution hazard exposure map may comprise a super resolution resolved via up-scaling to high resolution and applying auxiliary spatiotemporal climate data.

The asset protection may further comprise or include, for example, wherein the at least one high resolution exposure map comprises a collection of high resolution exposure maps super resolved from a collection of lower resolution exposure maps derived from a climate model for a plurality of hazards. The at least one high resolution exposure map may comprise a plurality of collections of high resolution exposure maps super resolved from a plurality of collections comprising lower resolution exposure maps.

The lower resolution exposure maps in a collection, for example, may be for a hazard and derived from a set of models. The models may comprise commercially available climate models. Further, the auxiliary spatiotemporal climate data may comprise a contributing factor to a climate related event. The auxiliary spatiotemporal climate data may comprise at least one of vegetation, land cover type, and monthly average temperature anomalies. And further yet, the auxiliary spatiotemporal climate data may comprise at least one of temperature, dryness, wetness, rainfall, land surface type, and altitude.

The asset protect may be configured such that, if the risk is above a predetermined threshold, then the application of automated remediation measures to reduce the risk are initiated and performed. The threshold of risk may be varied relative to value of the asset.

In one embodiment, there is provided a super-resolution climate device, comprising, an input mechanism configured to receive a set of hazard model collections, a harmonization module configured to simulate models of the hazard model collections to produce a corresponding set of hazard map collections, a super resolution module configured to upscale a resolution of the hazard exposure maps and apply auxiliary spatiotemporal datasets to the up-scaled hazard exposure maps, and an asset level evaluator configured to estimate risk posed to an asset based on its location and the super resolved hazard exposure maps. The asset level evaluator may be configured to retrieve climate data from the super resolved hazard exposure maps based on the asset location.

The super-resolution climate device may further comprise an advice module that prints out a report about the severity of an upcoming climate or climate induced risk relative to assets and/or an action module that signals a shutdown, back-up, or a climate event preparation alert to asset facility operators (or others as noted elsewhere herein). The action module may start at least one of a shutdown, back-up, or other disaster preparation procedure/action such as physically taking action to prevent damage by the predicted or occurring event.

In one embodiment, a super resolution module comprises an input for Spatial pre-processed land cover type, an input for temporal pre-processed auxiliary variables, an input for a low resolution hazard exposure map, an upscaling module comprising a filtered or filterless operation for up-scaling the low resolution hazard map; a convolution module configured to merge the up-scaled low resolution hazard map and the land cover and auxiliary variables data to produce a high resolution exposure map, and an output configured to output the high resolution exposure map for use in climate projection planning and asset preservation. The upscaling module and convolution module may be configured to operate in tandem (e.g., repeatedly convolving 2D and then upscaling 2D until a desired resolution is reached). In one alternative, the upscaling module and the convolution module may be configured to operate in tandem, repeatedly convolving 2D and Relu, and then concatenating and 1D converting.

The various embodiments may be embodied as a climate model service, comprising, for example, a web page displaying one or more parameters for activating a climate model, and an API connected to the web page such that the API receives one or more parameters for the climate model and invokes the climate model using the parameters, the web page may be configured to display results of the climate model invocation. The parameters may comprise an asset location and the results may comprise an indication of risk from applying the asset location to a corresponding location on high resolution hazard exposure map.

The high resolution hazard exposure map may comprise, for example, a super resolution version of a lower resolution hazard exposure map. The super-resolution version may comprise an up-scaled hazard exposure map convolved with a high resolution climate related data source. The high resolution climate related data source may comprise auxiliary (aux) data of at least one of temperature, dryness, humidity, wetness, rainfall, land surface type, altitude, a contributing factor to one or more types of risk, vegetation, land cover type, soil, and temperature anomalies. One or more of the auxiliary data may comprise an integration of an auxiliary data over time. The auxiliary data, for example, may be spatiotemporally harmonized with the high resolution hazard exposure map.

The service may be provided based on subscription and may be provided on a push basis where updates affecting one or more of a subscriber's asset locations are pushed to the subscriber. The pushes may be sent, for example, to the subscriber via one of a notification, email, text message, and hard copy letter such as overnight. The pushes may be sent, for example to a plurality of stakeholders in a subscribing organization's personnel structure or a combination of the subscriber's organization and local officials (e.g., county emergency or disaster relief organizations).

In one embodiment, a learning system is utilized. For example, a learning system comprising a learning paradigm based on a super resolution of a hazard model at a first resolution and at least one auxiliary dataset of a second resolution higher than the first resolution. The learning system may be trained via comparison of the super resolution hazard model to spatiotemporal harmonized historic events and real-time conditions against a spatial test model. The trained learning system may be applied to evaluate a high resolution hazard exposure map with respect to at least one asset location. The hazard model may comprise a collection of hazard models of a base environment or climate.

Any of the embodiments or features of the learning system (e.g., machine learning) may be further utilized to provide an asset level risk exposure decision for an automated preservation/damage prevention action, such as backing up computer and/or network systems data or physical prevention protective measures at a location, facility or infrastructure. The system may be entirely dependent upon computer implemented instructions and processes without intervention of any mental process. The models may be, for example, fire exposure models, and the hazard model may comprise a collection of hazard models (e.g., a plurality of models at a plurality of different times each super resolved according to a plurality of auxiliary spatiotemporal datasets).

The learning paradigm may comprise or include a weighting various Hazard Exposure Maps or portions thereof based on the application historic and near real-time events compared to a test sample. The weighting may comprise at least one of matching conditions within an area of the asset to the asset location, matching conditions outside an area of the asset to the asset location, weighting results of the asset matching based on distance from asset location, weighting results of the asset matching based on environmental zone. The weighting may comprise weighting results of matching results based on environmental zone. The weighting may comprise wherein at least one of a same zone match is weighted higher than another zone, a similar zone match is weighted higher than another zone; a similar close zone match is weighted higher than a similar distant zone match, a similar zone at a same latitude is weighted higher than a similar zone at a higher or lower latitude.

In one embodiment, a method of protecting assets is provided, for example, comprising the steps of, determining a climate related hazard risk at an asset location; if the hazard risk is above a predetermined threshold, applying proactive measures to protect the asset. The climate related hazard risk may be determined via a super resolution of a hazard exposure map evaluated with respect to historic and active or near real-time events at the asset location. The super resolution may comprise, for example, a super resolution of a plurality of hazard models. The plurality of hazard models may comprise, for example, the same hazard model at different times (e.g., temporally separated instances of the model). Further, the plurality of hazard models may comprise, for example, a plurality of different hazard models which may be, for example, a plurality of different hazard models related to fire or floods. The plurality of hazard models may comprise a plurality of different hazard models at a plurality of different time frames.

Applicable to any of the immediately preceding, for example (and others), the various embodiments may further comprise training a learning engine based on the hazard model or models along with historic and/or current events data with respect to test data, applying the trained engine to at least one asset location to determine an amount of risk at the asset location, and implementing a protective measure for the asset according to the amount of risk allocated to the asset location. The protective measure may comprise, for example, fire and/or flood damage mitigation. A fire damage prediction may further be used in a related flood damage prediction, such as in the application of an operational mask that takes the fire damage into account. The protective measure may comprise an automatically implemented damage mitigation (e.g., lifting draw bridges, closing flood gates, or releasing penned animals). The protective measure may comprise making the asset more fire-resistant. The protective measure may comprise sending an alert displayed on key personnel mobile devices or activating automated measures.

In describing the embodiments, and as illustrated in the drawings, specific terminology is employed for the sake of clarity. However, the various embodiments are not intended to be limited to the specific terminology so selected, and it should be understood that the ordinarily skilled artisan may utilize similar, related, or even different terminology depending on the embodiment or selected topic therein to discuss or describe the same. Further, it should be understood that each specific element includes all technical equivalents which operate in a similar manner, as will be understood by the artisan. Furthermore, the inventors recognize that newly developed technologies not now known may also be substituted for the described parts and still not depart from the scope of the present application or any of the embodiments. All other described items, including, but not limited to datasets, websites, APIs, reports, resolutions, etc. should also be considered in light of any and all available equivalents.

Portions of the various embodiments may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The various embodiments, or portions thereof, may also be implemented by the preparation of application specific integrated circuits or by interconnecting an appropriate network of conventional component circuits, as will be readily apparent to those skilled in the art based on the present disclosure.

The various embodiments include a computer program product which is a storage medium (media) having instructions stored thereon/in which can be used to control, or cause, a computer to perform any of the processes of the embodiments. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the embodiments may include software for controlling both the hardware of the general purpose/specialized computer or microprocessor, and for enabling the computer or microprocessor to interact with a human user or other mechanism utilizing the results of any embodiment or variations/equivalents thereof. Such software may include, but is not limited to, device drivers, operating systems, and user applications. Ultimately, such computer readable media further includes software for performing any embodiment as described above and equivalents thereof.

Included in the programming (software) of the general/specialized computer or microprocessor are software modules for implementing the teachings of the various embodiments, including, but not limited to, retrieving asset data, running climate models, harmonizing data in space, resolution and time, up-sampling (up-scaling), training, applying high resolution risk or hazard exposure maps at specified locations and the display, storage, or communication of results according to the processes as described herein and equivalent processes whether or not described herein. For example, in one embodiment a service is provided through a web portal or website, wherein a user provides location data and selects a hazard type.

For example, a climate model service, invoked via a web page displaying one or more parameters for activating a climate model. An API may be connected to the web page such that the API receives one or more parameters for the climate model and invokes the climate model using the parameters, and then the web page may display results of the climate model. The parameters may be any of those discussed above, such as an asset location and the results comprise an indication of risk from applying the asset location to a corresponding location on a high resolution hazard exposure map built by the climate model but is not necessarily presented to the user. The high resolution hazard exposure map may be, for example, a super resolution version of a lower resolution hazard exposure map. The super-resolution version may be an up-scaled hazard exposure map convolved with a high resolution climate related data source (e.g., Auxiliary data) and such data may be integrated over time and/or weighted.

The exemplary service may be provided by, for example, subscription. Updates affecting one or more of a subscriber's asset locations may be pushed to the subscriber via any of, for example, a notification, email, text message, and hard copy letter such as overnight, and such pushes may be sent to a plurality of stakeholders in a subscribing organization's personnel structure.

Further, such service may be linked to a subscriber (or subscribing organizations) assets or other systems, and provide signals to take certain measures automatically upon certain per-determined levels of risk or other conditions.

The various embodiments described herein may suitably comprise, consist of, or consist essentially of, any of element (the various parts or features of the embodiments, e.g., super-resolution module, climate model simulation, preparing and maintaining collections of models and model outputs, applying the model collections and preparing reports, alerts or other information produced by the application, and their equivalents as described herein. Further, the embodiments illustratively disclosed herein may be practiced in the absence of any element, whether or not specifically disclosed herein. Obviously, numerous modifications and variations of each embodiment are possible in light of the above teachings. It is therefore to be understood that within the scope of any claims, the invention, or any embodiment thereof, may be practiced otherwise than as specifically described herein.

What is claimed is:

1. A computerized method in a real-time climate data processing system having an analyst interface, the method comprising:

generating, by at least one processor, a super-resolved hazard exposure map that improves the accuracy and resolution of climate risk analysis using super-resolution modeling and machine learning to yield high-resolution hazard maps and automated risk predictions not achievable by mental calculation, the generating comprising, obtaining a first set of climate data at a defined resolution;

obtaining a timed or synchronized data file of a second set of climate data different from the first set of climate data and at a higher resolution compared to the first set of climate data;

generating a stream of output morph data items corresponding to each pixel at the higher resolution by interposing the second set of climate data at timed or synchronized up sampled pixels of the first set of climate data;

generating a spatially and temporally harmonized catalog of past climate events and a stream of current or near-term climate conditions, wherein said catalog and stream are used to continuously update the hazard exposure map in real-time;

training a learning engine based on the generating a stream of output morph data items and catalog to produce at least one super resolved high resolution exposure map;

applying a location of the asset to the at least one super resolved high resolution exposure map to determine an amount of risk to the asset; and preparing a reporting view (analyst interface) based on said applying to produce a risk assessment for an analyst;

wherein:

the reporting view provides an interactive dashboard comprising at least: (i) a map centered on the asset's location with the risk results overlayed, and (ii) one or more adjustable model parameters that, when modified by the analyst, automatically update the risk results in near-real time;

the reporting view is communicated electronically to the analyst and onto a computer screen via a web page, email, or other electronic communication; and the results reported comprise risk to the asset.

2. The method according to claim 1, wherein the reporting view allows the analyst to allocate resources where most needed or highest investment return.

3. The method according to claim 1 wherein such risk assessment is used for preparation for a highest investment return over a portfolio of assets.

4. The method according to claim 1 wherein such risk assessment is utilized to more accurately model capacity of a power facility.

5. The method according to claim 1, wherein a response includes a transaction such as the trading of power and the risk assessment may be utilized to initiate the transactions automatically.

6. The method according to claim 1, wherein the high resolution exposure map was super resolved via up-scaling to high resolution and applying auxiliary spatiotemporal climate data.

7. The method according to claim 1, wherein if the risk is above a predetermined threshold, then applying automated remediation measures to reduce the risk;

an allocation of resources applied to the asset based on rate of return.

8. The method according to claim 7, wherein the reporting view comprises a list of personnel notified of the risk and/or remediation measures to be implemented.

9. The method according to claim 7, wherein the resources applied to the assert are based on a highest investment return.

10. The method according to claim 7, wherein the automated remediation measures comprise underwriting an insurance policy.

11. The method according to claim 7, wherein:

the asset location comprises a power system facility;

the automated remediation measures comprises a two-step process of backing up facility data and then at least partially shutting down the facility.

12. The method according to claim 7, wherein the automated remediation measures comprises underwriting an insurance policy, backing up facility data, and shutting down the facility.

13. The method according to claim 7, wherein the assessment comprises electrical capacity and the automated remediation measures comprises trading or purchase of power.

14. The method according to claim 7, wherein the assessment comprises power capacity and the automated remediation measures comprises routing of power.

15. The method according to claim 7, wherein the risk assessment includes durability of the asset based on trends and/or patterns of risk factors.

16. The method according to claim 15, wherein the trends comprise trends associated with changing weather patterns.

* * * * *